July 1, 1924.
H. C. WILKINSON
IMPRINTING MACHINE
Filed Jan. 18, 1922
1,499,796
Fig. 1.
Fig. 2.
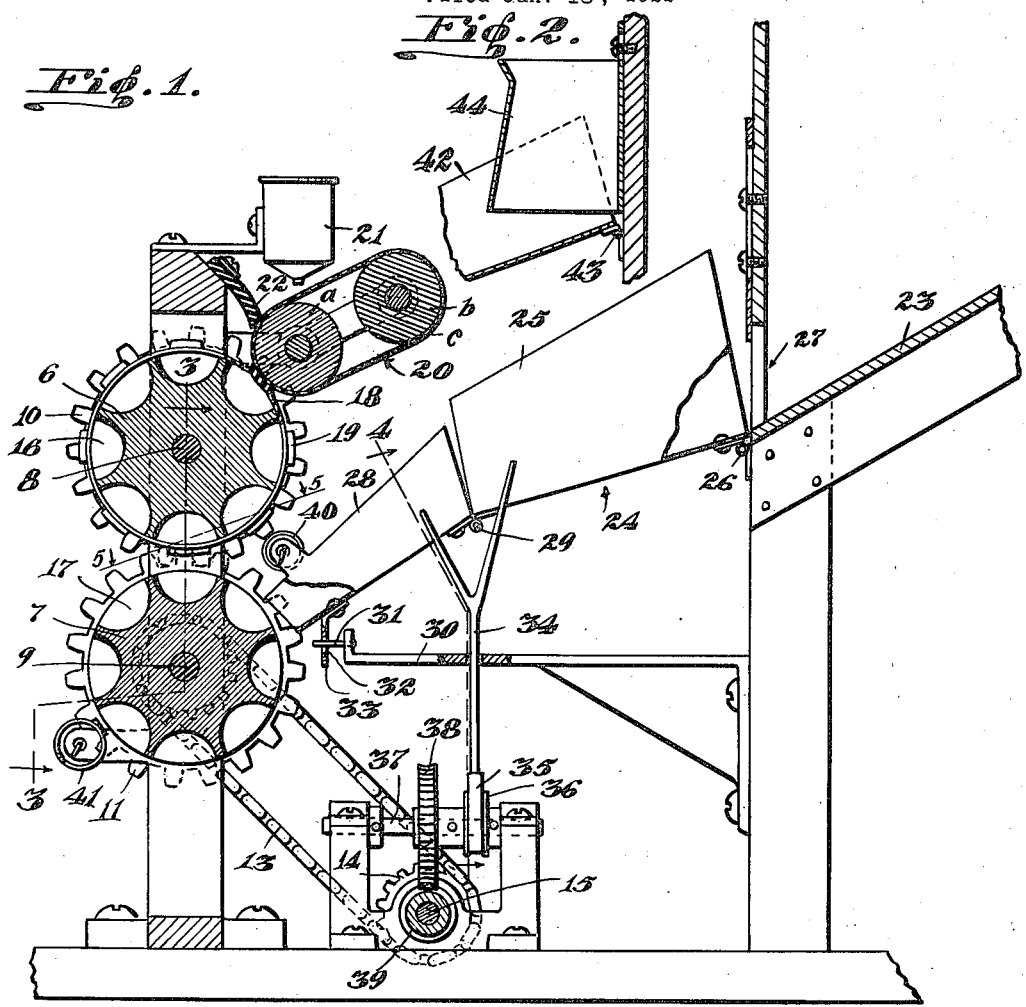
Fig. 3.
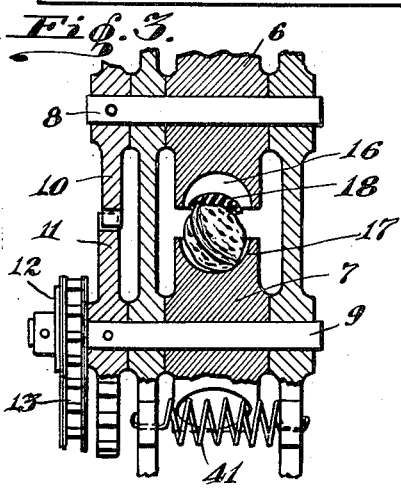
Fig. 4.
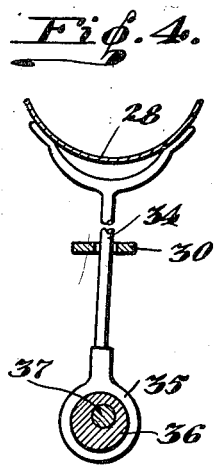
Fig. 5.
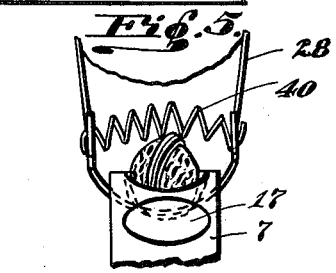
Inventor
Harris C. Wilkinson,
By
N. W. Crandall
Attorney Patented July 1, 1924.

1,499,796

UNITED STATES PATENT OFFICE.

HARRIS C. WILKINSON, OF LOS ANGELES, CALIFORNIA.

IMPRINTING MACHINE.

Application filed January 18, 1922. Serial No. 530,208.

*To all whom it may concern:*

Be it known that I, HARRIS C. WILKINSON, a citizen of the United States, residing at Los Angeles, in the county of Los Angeles and State of California, have invented new and useful Improvements in Imprinting Machines, of which the following is a specification.

My invention particularly pertains to a machine for imprinting indicia on articles of substantially spherical form, such as nuts, citrus fruits, ball confections, chewing gum and the like.

An object of my invention is to provide a machine of the above character which is capable of rapid output with a minimum of waste due to misprinting and without injury to the article acted on.

Another object is to provide effective means for imprinting on substantially spherical articles while the latter are in motion and to provide means for feeding the articles singly to a printing device from a hopper, bin, conveyor, or other similar device.

Another object is to provide means for insuring proper delivery and discharge of the articles to and from the printing device so as to obviate possibility of clogging the machine.

A further object is to provide a device for accurately imprinting on curved surfaces.

With the foregoing objects in view, together with such other objects and advantages as may subsequently appear, my invention resides in the parts, and in the construction, arrangement and combination of parts or their equivalents hereinafter more fully described and claimed and illustrated in the accompanying drawings in which;

Figure 1 is a view of the machine as seen in vertical section, partly in elevation;

Fig. 2 is a detail in section showing a modified form of the feeding device;

Fig. 3 is a detail in section as seen on the line 3—3 of Fig. 1, showing the manner of forming an imprint on a substantially spherical object;

Fig. 4 is a detail in section and elevation, as seen on the line 4—4 of Fig. 1;

Fig. 5 is a detail in plan, as seen in the direction indicated by the arrow 5 in Fig. 1.

More specifically, 6 and 7 indicate a pair of superposed rollers affixed to shafts 8 and 9 geared together by spur gears 10 and 11 mounted on the shafts 8 and 9, whereby the rollers may be rotated in unison. The shaft 9 is fitted with a sprocket 12 engaged by a sprocket chain 13 passing around a sprocket wheel 14 on a drive shaft 15 adapted to be driven from any suitable source of power. The rollers 6 and 7 are formed on their peripheries with recesses 16 and 17 arranged so that the recesses 16 will be disposed opposite the recesses 17 as the rollers revolve, so that spherical articles delivered to the recesses 17 as will presently be described may readily pass between the rollers. Encircling the roller 6 and spanning the recesses 16 is a flexible, resilient band 18 having such tension as to normally retain a cylindrical form around the roller, and yet be adapted to yield when pressure is brought to bear thereon opposite the recesses, and formed on the outer surface of the band are raised protuberances 19 bearing suitable imprinting characters in the form of type which are flexible and are preferably formed integral with the band; the band and type being made of rubber, rubber composition or the like.

An inking device 20 is provided for the purpose of inking the type on the printing roller which device is here shown as comprising a pair of rollers $a$ and $b$ carrying an inking belt $c$; the roller $a$ being arranged with its periphery adjacent to the periphery of the printing roller so that the type on the printing roller will be caused to bear against and frictionally engage the belt to effect rotation of the belt and rollers and at the same time ink the type. Ink is fed to the belt from a reservoir 21 and is distributed thereover by means of a wiper 22 as the belt advances; the wiper comprising a flexible strip bearing transversely of the belt.

Leading from a hopper 23 is a conveyor 24 adapted to feed the article to be imprinted from the hopper 23 to the imprinting device. The conveyor is here shown as comprising a trough section 25 connected at one end of its bottom wall by a loose hinge connection 26 to the hopper 23 adjacent a discharge opening 27 in the latter, which trough leads outwardly and downwardly from the hopper at a slight incline and communicates with a second trough section 28 extending downwardly at a sharp inclination and terminating at its outer lower end, adjacent the roller 7. The trough sections are here shown as hingedly connected together by hinge 29 connecting the outer end of the bottom wall of the trough 25 with the upper end of the bottom wall of the trough 28, whereby the trough sections may have articulate movement relative to each other.
The lower end of the trough section 28 is loosely supported on a bracket 30 by a pin 31 on the bracket extending into a slot 32, in a hanger 33, carried by the trough section 28. This mounting of the trough sections 25 and 28 permits their being vibrated vertically and at the same time oscillated laterally, so as to cause the articles delivered to the trough section 29 from the hopper to advance in the latter and be deposited singly into the trough section 28.

Means are provided for effecting the vibrating and oscillating movement of the trough section and here shown as comprising a vertically arranged connecting rod 34, the upper end of which engages the troughs and the lower end of which is provided with a sleeve 35 encircling an eccentric 36 on a shaft 37 fitted with a gear 38 meshing with a worm gear 39 on the shaft 15; the rod 34 is guided in an opening 35 and the bracket 30 in such manner that it may reciprocate and oscillate on rotation of the eccentric.

The lower end of the trough 28 is arranged to discharge the articles into the recesses 17 in the roller 7 as the latter rotates; the trough terminating at a point adjacent the upper portion of the roller and the latter being rotated in such direction as to lift the articles as they are discharged from the trough.

As a means of insuring the article moving between the rollers a yieldable guard 40 is arranged across the upper portion of the lower end of the trough section 28 which guard is here shown as comprising a spiral spring.

As a means for insuring discharge of the articles from the recesses 17, a yieldable wiper 41 is provided which comprises a spiral spring and is arranged adjacent the lower portion of roller 7 in such position as the latter rotates, the articles projecting from the recesses 17 will be engaged by the wiper and ejected from the recesses.

In the operation of the invention the articles to be marked are placed in a hopper 23 from which they are fed thru the opening 27 to the trough section 25 and caused to advance from the latter and pass thru trough section 28 by vibration of the trough section vertically and laterally, as before described. The articles pass into one of the recesses 17 and are thereby advanced between the rollers and brought into contact with the flexible type and its yieldable mounting extending over one of the recesses 16 in the roller 6. The band 18 and the type yield under the pressure imposed thereon by the article so that the type will conform to the curved surface of the articles, as indicated in Fig. 3, so that the articles will receive the imprint of the inked character of the type as it passes between the rollers. On continued rotation of the roller 7, the imprinted articles will be ejected therefrom by the wiper 41.

As a means for insuring the articles being fed one at a time thru the trough 25 the construction shown in Fig. 2 may be employed if desired, in which the trough section, as indicated at 42 is hinged at 43 to the rear edge of a hopper 44 having an outwardly flared open lower end extending above the bottom of the trough 42 in such manner that articles carried in the hopper will be supported by the trough. The forward edge of the hopper 44 is spaced from the bottom of the trough which is inclined. On downward movement of the trough the space between the forward edge of the hopper and the bottom wall of the trough is widened to permit the passage of one or more of the articles to be imprinted and on upward movement of the trough section the space is restricted to prevent the passage of an article from the hopper at this moment. In this manner the articles may be fed from the hopper with a slight lapse of time between the succeeding articles, thus insuring against clogging of the feed mechanism.

It is obvious that by constructing the feed trough as shown it will be impossible for more than one article at a time to be released therefrom to the carrier roll, since the lowermost article in the trough will be held from delivery first by the preceding article deposited in a recess and then by the intervening land or raised portion between the adjacent recesses.

I claim:

1. In a printing device, a printing roller formed with a series of peripheral recesses, a tensioned yieldable member spanning the recesses, and yieldable type on said member opposite the recesses.

2. In a printing device, a printing roller formed with peripheral recesses, a tensioned flexible resilient member spanning the recesses which will yield under pressure and return to normal when relieved of pressure, and yieldable type on said member opposite the recesses.

3. In a printing device, a printing roller, a carrier roller formed with article receiving recesses, said rollers arranged to convey articles in the recesses between the peripheries of the rollers, said printing roller being formed with peripheral recesses into which the articles may extend when passing between the rollers, and a tensioned yieldable type carrying member spanning the recesses on the printing roller.

4. In a printing device, a printing roller, a carrier roller formed with article receiving recesses, said rollers arranged to convey articles in the recesses between the peripheries of the rollers, said printing roller being formed with peripheral recesses into which the articles may extend when passing between the rollers, a yieldable type carrying member spanning the recesses on the printing roller, means for delivering articles to be printed to the carrier roller, and a spiral spring arranged transversely of the carrier roller adapted to operate on rotation of the carrier roller to engage and eject the articles carried in the recesses.

5. In a printing device, a printing roller having a series of peripheral recesses, a cylindrical resilient band encircling said roller and spanning the recesses, and flexible imprinting characters formed on said band opposite said recesses.

HARRIS C. WILKINSON.